United States Patent [19]

Capel

[11] Patent Number: 5,029,062
[45] Date of Patent: Jul. 2, 1991

[54] ELECTRICAL REGULATION AND ENERGY TRANSFER CIRCUIT

[75] Inventor: Antoine Capel, Ramonville, France

[73] Assignee: Alcatel Espace, Courbevoie, France

[21] Appl. No.: 508,676

[22] Filed: Apr. 13, 1990

[30] Foreign Application Priority Data

Apr. 14, 1989 [FR] France .................. 89 04972

[51] Int. Cl.[5] ................................. H02M 3/335
[52] U.S. Cl. ............................ 363/26; 363/25; 363/97
[58] Field of Search ............... 363/24, 25, 26, 97, 363/124, 133, 134

[56] References Cited

U.S. PATENT DOCUMENTS

| 3,668,508 | 6/1972 | Archer et al. | 363/26 |
| 4,034,280 | 7/1977 | Cronin et al. | 363/124 |
| 4,251,857 | 2/1981 | Shelly | 363/26 |
| 4,347,560 | 8/1982 | Seiersen | 363/24 |
| 4,425,613 | 1/1984 | Shelly | 363/26 |
| 4,600,984 | 7/1986 | Cohen | 363/26 |
| 4,763,237 | 8/1988 | Wieczorek | 363/124 |
| 4,849,651 | 7/1989 | Estes | 363/134 |
| 4,901,215 | 2/1990 | Martin-Lopez | 363/26 |

OTHER PUBLICATIONS

PESC '88 Record (Apr. 1988) "Series-Resonant Energy Conversion with Multi-Segment Current Waveforms for Bipolar Energy Flow", J. Ben Klaasens and Jeroen van Duivenbode.

PESC '86—17th Annual IEEE Power Electronics Specialists Conference, Nov. 1986, pp. 684–695, IEEE, New York, U.S.A.; A. Capel et al.: "A Bi-directional High Power Cell Using Large Signal Feedback Control with Maximum Current Conduction Control (MC3) for Space Applications".

INTELEC '86—Conference Proceedings, Toronto, Oct. 19–22, 1986, pp. 437–443, IEEE, New York, U.S.A.; E. Rhyne et al.: "A New Concept for DC to AC Inverters and Ringing Generators".

PESC '86—17th Annual IEEE Power Electronics Specialists Conference, Nov. 1986, pp. 367–374, IEEE, New York, U.S.A.; T. Ninomiya et al.: "Analysis of the Static and Dynamic Characteristics of Push-Pull Parallel Resonant Converters".

Primary Examiner—Steven L. Stephan
Assistant Examiner—Jeffrey Sterrett
Attorney, Agent, or Firm—Sughrue, Mion, Zinn, Macpeak & Seas

[57] ABSTRACT

A circuit for regulating an electrical parameter to be servo-controlled by transferring electricity between two networks (11, 12), wherein the circuit (10) is a bidirectional current circuit providing electrical isolation between the two networks (11, 12). The circuit is particularly applicable to space applications.

6 Claims, 2 Drawing Sheets

ELECTRICAL REGULATION AND ENERGY TRANSFER CIRCUIT

BACKGROUND OF THE INVENTION

The invention relates to a circuit for regulating an electrical parameter while transferring energy between two networks.

The circuit of the invention may be used whenever an electrical parameter needs to be servo-controlled by means of a transfer of energy. It is applicable, in particular, to consumer, aeronautical, and space applications. In space, this type of servo-control is used for platforms (power conditioning), BAPTA control (for "Bearing and Power Transfer Assembly"), attitude control by means of inertia wheels, etc. . . . ), and also for payloads (electrical power supply, aiming control, active thermal control, etc.).

The following functions may be mentioned, inter alia:

platform:
charging/discharging batteries;
energy conditioning by inertia wheels;
power conditioning; and
controlling DC stepper type motors; and payload:
converters and regulators for equipment;
low voltage electronic power conditioner (EPC) using a solid state power amplifier (SSPA) and high voltage EPC using a traveling-wave tube amplifier (TWTA);
radar and altimeter power supply; and
motor control in pointing mechanisms for antennas, radio meters, lasers, etc. . . . .

There are two ways in which a parameter may be regulated by an electrical structure:

by series or parallel resonance using a transistor or thyristor H bridge; and pulse width modulation (PWM) control.

In both cases, energy is transferred without metallic isolation whenever it is necessary to combine the advantages of static and dynamic transfer (energy efficiency of better than 90%).

Resonant structures associate an LC circuit with a set of switches constituting H-bridges, with each bridge being connected to the electricity network exchanging energy flow.

In one possible embodiment, the switches are thyristors ("Series-Resonant Energy Convergence With Multi-Segment Current Waveforms For Bipolar Energy Flow" by J. B. Klaassens and J. Van Duivenbode, published in PESC 88 RECORD, April 1988). The LC resonant network is the link between the two networks exchanging energy, with the other networks being disconnected by the switches.

The servo-controlled parameter is generally the voltage of the energy-receiving network.

Another type of application described in the above-mentioned document (PESC 88) defines an energy conditioner between two inertia wheels. Each wheel is represented by an inductor and a current source. The resonant network is completed by capacitance C common to both networks.

These applications are characterized by the flow of sinewave type currents.

PWM structures are characterized by controlling the width of switch pulses and by a flow of triangular wave type currents.

The object of the invention is to reduce electrical losses as much as possible in circuits of this type.

In another prior art document entitled "A Bidirectional High Power Cell Using Large Signal Feedback Control With Maximum Current Conduction Control ($MC^3$) For Space Applications", published in IEEE 1986, the principle of bidirectional energy transfer is analyzed and control by means of a state variable in a high signal system is described for "smart" PWM, with the advantages of this technique being described for a battery regulator. The large signal analysis and the mathematical module are described by using a DC state variable model over one sampling period. The behavior under $MC^3$ current control is tested and its equivalent model is verified by simulation.

However, such a circuit provides no metallic isolation: there is no ground decoupling, and this is very important, in particular for obtaining noise immunity.

SUMMARY OF THE INVENTION

The object of the present invention is to mitigate these various drawbacks.

To this end, the present invention provides a circuit for regulating an electrical parameter to be servo-controlled by transferring electricity between two networks, the said circuit being a bidirectional current circuit which provides electrical isolation between the two networks and which includes a plurality of switches, the circuit being characterized in that it comprises:

a current controlled modulator for driving switches so as to limit the peak current through the switches and the DC output current;

a transformer stage which is bidirectional from the energy exchange point of view and which is peak current limited, the transformer stage serving to deliver a voltage and a current which are regulated and to provide metallic isolation;

a power stage control system comprising:
an impedance matching circuit; and
a current controlled section connected to the power stage via a driver stage and receiving a signal from a clock module and a signal from the input network; and
a push-pull stage which is bidirectional for current.

As a result, energy is exchanged using different values of voltage and current ($V_1$, $i_1$ on one side, $V_2$, $i_2$ on the other) with the purpose of reducing electrical losses to a minimum such that ideally $V_1 \cdot i_1 = V_2 \cdot i_2$.

Advantageously, the circuit of the invention includes switches associated with reactive components for smoothing the switching; it operates under sampled conditions by using lossless switches.

It thus makes it possible:

to transfer electrical energy in both directions between two electrical networks, while keeping the networks electrically isolated from each other; and to obtain static or dynamic type energy transfer.

Advantageously, in the circuit of the invention, excess energy is recovered and transferred from the output of the circuit to the input network, with said excess energy being minimized by increasing the passband of the said circuit.

This makes it possible to achieve bidirectional energy transfer that enables high electrical efficiency to be obtained.

Advantageously, the circuit of the invention which includes a current controlled modulator for driving the switches so as to limit peak current through the switches and in the DC output current, thus making it possible:

to limit the current delivered to the external network in the event of malfunction at the outputs from the networks, and to control the peak current through the switches so as to protect them from destructive surges; ideally these limits which are controlled by the determined on-times of the switches take place without loss;

to obtain immediate partial and final disconnection of the networks and also reconnection thereof in the event of structure or network malfunction and also under instructions sent by remote control, this being made possible by having controlled switches in the input and in the output of the bidirectional structure; and to define an electrical structure which is standardizable, whose weight and volume depend on conditions of use (working frequency, power transferred), and which is capable of exchanging energy between one input and a plurality of outputs (at a plurality of secondary voltages).

BRIEF DESCRIPTION OF THE DRAWINGS

The characteristics and advantages of the invention appear further from the following description given by way of non-limiting example and made with reference to the accompanying figures, in which.

DETAILED DESCRIPTION OF THE PREFERRED EMBODIMENT

Figure 1:
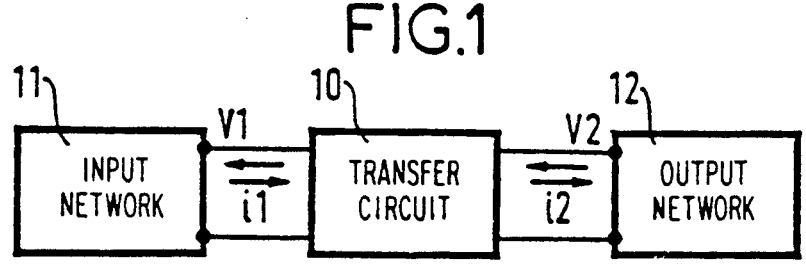
FIG. 1 is a block diagram of a circuit of the invention.

In FIG. 1, the circuit of the invention 10 is disposed between an input network 11 and an output network 12. This circuit is an electrical structure made up of perfect switches associated with reactive components (capacitors, inductors, a transformer) for the purpose of causing energy to be transferred between the two electrical networks 11 and 12 which are connected thereto, while providing metallic isolation therebetween. This energy transfer takes place with different values of voltage and current ($V_1$, $i_1$ on one side, $V_2$, $i_2$ on the other) for the purpose of reducing electrical losses to a minimum, such that ideally: $V_1 \cdot i_1 = V_2 \cdot i_2$.

An electrical structure of this type must therefore operate under sampled conditions using lossless switches.

Advantageously, the circuit of the invention makes it possible to:

cause electrical energy to be transferred between these two electrical networks 11 and 12 while maintaining electrical isolation therebetween;

achieve static type or dynamic type energy transfer:

the transfer is of the static type when providing continuous energy flow from one network to the other with amplitude and direction of flow being controlled by appropriate servo-control mechanisms; for example, the circuit may control the triangular electricity power supply of a satellite between its solar cells, its batteries, and its loads;

the transfer is dynamic whenever energy transfer implies immediate recovery of excess energy from one network on another, in order to obtain ideal transient waveforms; this occurs when a pulsed electrical network (of the radar type) is associated with a DC source; dynamic transfer is also applicable to static utilization whose frequency behavior requires a wide passband in both utilization directions; dynamic transfer also applies to conventional single direction static utilizations by improving frequency performance (passband, margins) and pollution (noise rejection, transconductance);

to obtain bidirectional energy transfer giving high electrical efficiency, essentially for two reasons:

excess energy is recovered and transferred from the output to the input filter or input network 11 instead of being dissipated; and the excess energy to be recovered is minimized by increasing the passband of the system;

use a current controlled modulator for driving the switches, thereby limiting both the peak current through the switches and the DC current at the outputs from the networks; these limitations are controlled by the determined ON times of the switches and are ideally without loss;

obtain immediate partial, and final disconnection of the networks as well as reconnection thereof in the event of structure or network malfunction and also on instructions under remote control, by virtue of having controlled switches in the input and in the output of the bidirectional structure; and define a standardizable electrical structure whose weight and volume depend on conditions of use (working frequency, power transfer), and which is capable of providing energy transfer between a single input and a plurality of outputs (with a plurality of secondary voltages).

Figure 2:
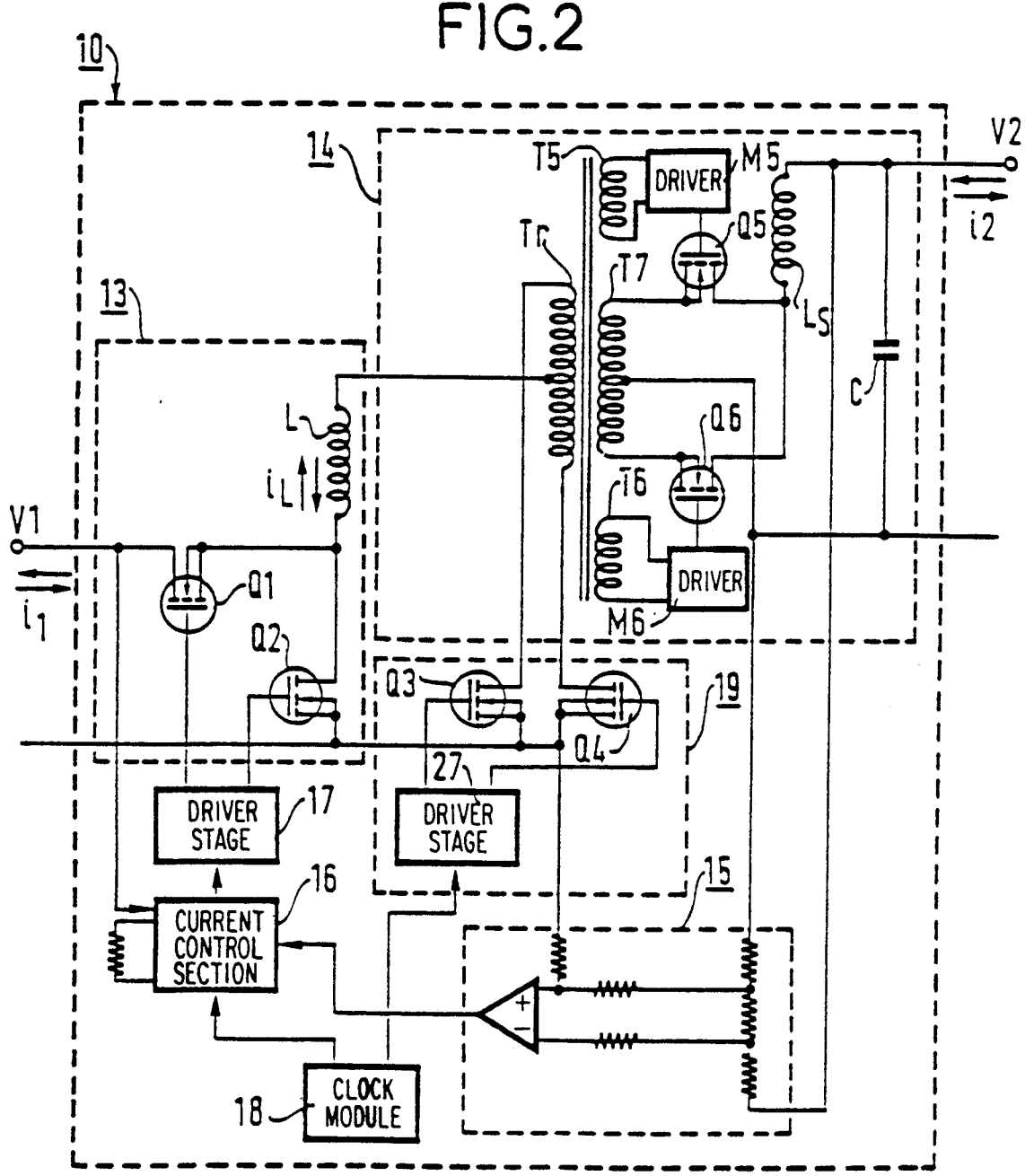
FIG. 2 is a circuit diagram of a circuit of the invention.

As shown in FIG. 2, the circuit of the invention comprises:

a bidirectional power stage 13;

a transformer stage 14 for providing a regulated current or voltage and capable of providing bidirectional energy transfer;

a power stage control system comprising:

an impedance matching circuit 15; and a current control section 16 connected to the power stage via a driver stage 17 and receiving a signal from a clock module 18 and a signal from the input network; and a bidirectional push-pull stage 19 including a driver stage 27.

The power stage 13 is represented by LC reactive components associated with switches Q1 and Q2 operating in PWM.

Metallic isolation is obtained by the transformer stage 14, using the switches Q3 and Q4 of the push-pull stage 19 to chop the DC voltage generated at the midpoint of a transformer Tr to a mark-space ration of 50%.

The energy transferred to the secondary of the transformer Tr in the form of a rectangular alternating voltage is rectified by switches Q5 and Q6 and filtered by the network LsC. In this embodiment, the servo-controlled parameter is a voltage V2.

The bidirectional aspect is obtained by replacing conventional unidirectional switches by bidirectional switches (transistors Q1, Q3, Q4 and diodes Q2, Q5, Q6, namely Hex-Fet having low resistance in both directions).

The essential difference over prior circuits lies in synchronous rectification by the switches Q5 and Q6, which rectification is automatically synchronizable by means of secondary windings T5 and T6 associated with driver modules M5 and M6. The magnetic part is an autotransformer which serves to adjust the voltages between the primary and the secondary without metallic isolation.

Figure 3:
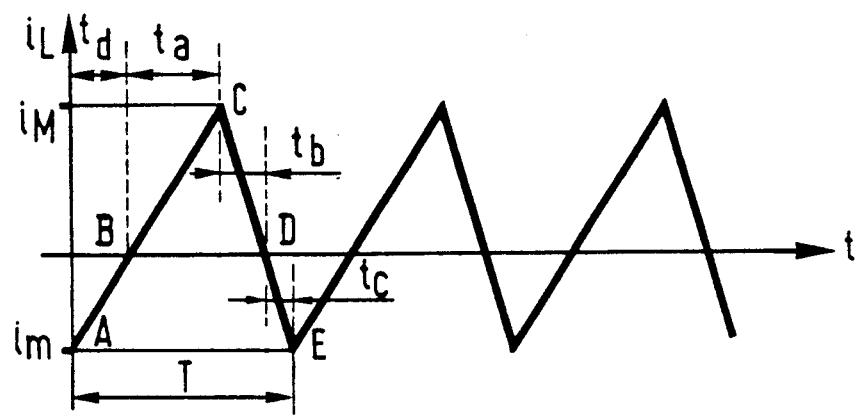
FIGS. 3 to 7 illustrate the operation of the embodiment shown in FIG. 2.

The current $i_L$ flowing through the electrical structure is triangular, as shown in FIG. 3, having positive and negative contributions when dynamic type transfer is taking place, such that the current $i_2$ delivered to the output network over a sampling period T is such that:

$$i_2 = (1/T) \int_0^T i_L(t)\, dt$$

Figure 4:
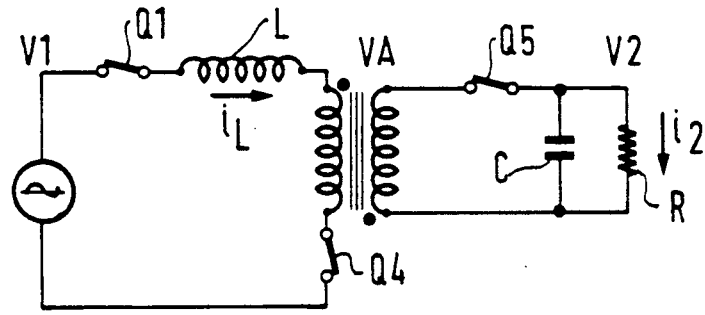

Four different electrical configurations can thus be observed depending on the way the various switches operate:

In the configuration shown in FIG. 4, the transistor Q1 of power stage 13 is ON as are switches Q4 and Q5 of the push-pull stage 19 and of the synchronous rectification due to the transformer stage 14 which operate at one half the frequency governing the power stage 13.

The current flowing through the inductor L goes from point B to point C in FIG. 3, with the current $i_L$ being such that $i_L = t(V1 - VA)/L$.

The maximum current $i_M$ through the inductor L is defined by $i_M = t_a(V1 - VA)/L$.

Figure 5:
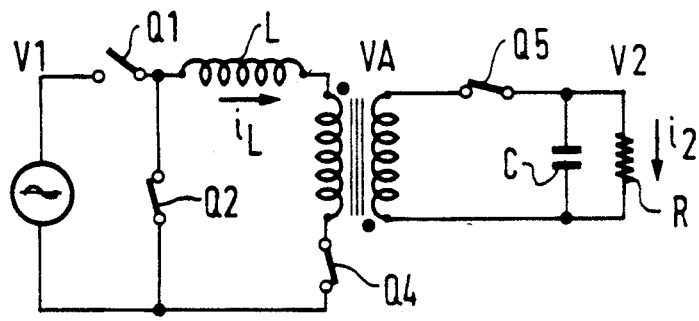

In the configuration of FIG. 5, the operating point is displaced positively from point C to point D, since Q1 is OFF and Q2 is ON. $i_L = i_M - t_b \cdot VA/L$.

At point D, $i_L(D) = 0$.

Also, $i_M = t_b \cdot VA/L$.

Figure 6:
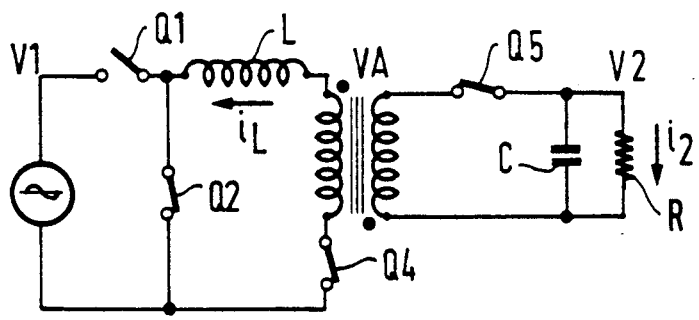

The configuration shown in FIG. 6 is a configuration in which the current reverses. Q2 of the power stage is still conducting. In this case the current retains the same slope such that from point D to point E, $i_L = -t \cdot VA/L$.

The peak negative current through the inductor L is $i_m = -t_c \cdot VA/L$.

Figure 7:
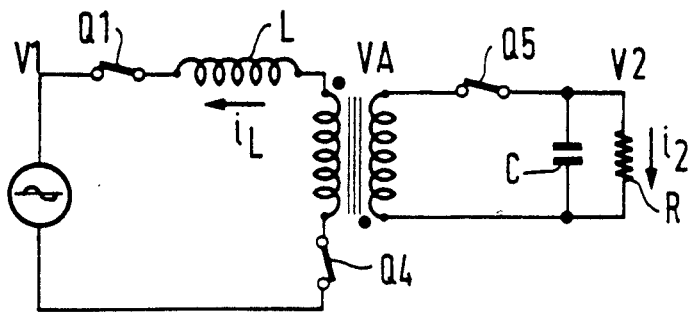

In the configuration of FIG. 7, current is still flowing in the reverse direction, but Q1 is ON and Q2 is OFF. The operating point moves from E or A to B. $i_L = i_m + t(V1 - VA)/L$, and at the limit, $i_L(B) = 0$.

If the periods of time for which these various configurations exist are $t_a$, $t_b$, $t_c$, $t_d$, then $t_a + t_b + t_c + t_d = T$.

And since the structure is bidirectional, these static equations are defined by:

$$V2/V1 = (t_a + t_d)/T$$

and $$VA/(V1 - VA) = (t_a + t_d)/(t_b + t_c)$$

The energy which transits through the structure over a period T is defined by:

$$E = VA \cdot T \cdot \tfrac{1}{2}(i_M - i_m)$$

By inserting a discrete current sensor as shown in FIG. 2, it is possible to impose a maximum value $i_M$ to the peak current in some applications and to impose both $i_M$ and $i_m$, i.e. both positive and negative peak currents in other applications, if the sensor is itself bidirectional.

Naturally, the present invention is described and shown merely by way of preferred example and its component parts could be replaced by equivalent parts without thereby going beyond the scope of the invention.

I claim:

1. A regulating circuit for regulating an electrical parameter to be controlled by transferring electricity between first and second networks, said circuit being a bidirectional current circuit which provides electrical isolation between said first and second networks and which includes a power stage (13) having a plurality of power stage switches, the circuit being characterized in that it further comprises:
   power stage drive means for driving said switches in response to a control signal;
   a transformer stage having a primary and a secondary and which is bidirectional from an energy exchange point of view and which is peak current limited, said transformer stage delivering a voltage and a current which are regulated and providing DC isolation between said first and second networks;
   a clock module;
   a power stage control system comprising an impedance matching circuit and a current controlled section receiving inputs from said clock module, said impedance matching circuit and said first network and providing an output signal as said control signal to limit a peak current through at least one of said switches and to limit a DC current at an output of said regulating circuit; and
   a push-pull stage which is bidirectional for current and which is coupled to said primary of said transformer.

2. A regulating circuit according to claim 1, wherein said switches are lossless switches.

3. A regulating circuit according to claim 1, characterized in that excess energy is recovered and transferred from the output of said regulating circuit to the first network, and in that said excess energy is minimized by increasing a passband of said regulating circuit.

4. A regulating circuit according to claim 1, wherein:
   said push-pull stage includes a plurality of push-pull switches,
   said transformer stage includes said transformer, a plurality of transformer stage switches and a filter network,
   the power stage includes reactive components associated with the switches of the power stage,
   DC isolation between said first and second networks is provided by said transformer stage (14), and
   a DC voltage generated at a midpoint of said transformer is chopped to a mark-space ratio of 50% by means of the switches of the push-pull stage, energy being transferred to the secondary of the transformer in the form of a rectangular alternating voltage and being rectified by said transformer stage switches and filtered by said filter network.

5. A regulating circuit according to claim 4, characterized in that all of said power stage, push-pull stage and transformer stage switches comprise Hex-FET transistors having low resistance in both directions.

6. A regulating circuit according to claim 1, further comprising means for varying an operating point of said regulating circuit to obtain both static and dynamic control of said electrical parameter.

* * * * *